United States Patent
Cihula et al.

(10) Patent No.: US 7,178,034 B2
(45) Date of Patent: Feb. 13, 2007

(54) METHOD AND APPARATUS FOR STRONG AUTHENTICATION AND PROXIMITY-BASED ACCESS RETENTION

(75) Inventors: Joseph F. Cihula, Hillsboro, OR (US); Baiju V. Patel, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 785 days.

(21) Appl. No.: 10/334,740

(22) Filed: Dec. 31, 2002

(65) Prior Publication Data

US 2004/0128500 A1    Jul. 1, 2004

(51) Int. Cl.
*G06F 1/24* (2006.01)
(52) U.S. Cl. .............. 713/186; 713/182; 713/193
(58) Field of Classification Search ............ 713/182, 713/186–193
See application file for complete search history.

(56) References Cited

U.S. PATENT DOCUMENTS

| | | | | | |
|---|---|---|---|---|---|
| 5,742,762 | A | * | 4/1998 | Scholl et al. | 709/200 |
| 5,832,487 | A | * | 11/1998 | Olds et al. | 707/10 |
| 5,857,190 | A | * | 1/1999 | Brown | 707/10 |
| 5,870,552 | A | * | 2/1999 | Dozier et al. | 709/219 |

* cited by examiner

*Primary Examiner*—Thomas R. Peeso
(74) *Attorney, Agent, or Firm*—David L. Guglielmi

(57) ABSTRACT

A method and apparatus for strong authentication and proximity-based access retention is presented. In this regard, an authentication agent is introduced to securely communicate with a key device associated with a user to identify the user, retrieve credentials for the user, securely communicate a session key to the key device, and identify the user who is requesting access to target resource(s) based on the user's credentials while the user's key device is proximate to the target resource(s).

30 Claims, 4 Drawing Sheets

METHOD AND APPARATUS FOR STRONG AUTHENTICATION AND PROXIMITY-BASED ACCESS RETENTION

TECHNICAL FIELD

Embodiments of the present invention generally relate to the field of security and, more particularly, to a method and apparatus for strong authentication and proximity-based access retention.

BACKGROUND

Corporations and other entities that are concerned about the security of their assets have utilized various methods to authenticate users. Because it is prohibitively expensive to hire security guards to watch over every asset, electronic methods are most commonly used to authenticate users.

One conventional method for authenticating users is to require users to carry a card that stores information about the user. The authentication system can then identify the user from the information on the card, and then determine whether or not to allow the user to access certain target resources. One example of this type of card is a Smart Card. A contact card is one form of card that can communicate with an authentication system by being placed in physical contact with a contact card reader. One problem with using this type of card to permit access to resources only when it is present is that users may forget to remove their card from the reader when they are done using a target resource.

Another form of card used in a conventional authentication system is one that contains a radio frequency (RF) transceiver. These cards are contactless in that they don't need to be physically inserted into a card programmer. A contactless card communicates wirelessly with an authentication system through sensors that detect the presence of the contactless card or by the card actively signaling to sensors. One problem that could occur with an authentication system that utilizes contactless cards is a replay attack. A replay attack is when an unauthorized user utilizes a device to eavesdrop on the wireless communication of an authorized user's card with the authentication system. The unauthorized user's device may then be able to replay the communication to "trick" the authentication system into believing the unauthorized user is actually the authorized user.

In both cases, the possession of a physical identity (the card) provides only a single factor of authentication. Stronger authentication uses more than one factor, such as both a physical card and a password and/or a biometric reading. While presentation of the physical identity may be very easy and quick, typically the additional authentication factor involves significantly more inconvenience and delay.

BRIEF DESCRIPTION OF THE DRAWINGS

Embodiments of the present invention is illustrated by way of example, and not by way of limitation, in the figures of the accompanying drawings in which like reference numerals refer to similar elements and in which.

DETAILED DESCRIPTION

Embodiments of the present invention are generally directed to a method and apparatus for strong authentication and proximity-based access retention. In this regard, an authentication agent is presented which employs an innovative method, in conjunction with a unique key device, to implement a secure asset grouping. In the following description, for purposes of explanation, numerous specific details are set forth in order to provide a thorough understanding of the invention. It will be apparent, however, to one skilled in the art that embodiments of the invention can be practiced without these specific details. In other instances, structures and devices are shown in block diagram form in order to avoid obscuring the invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments.

Figure 1:
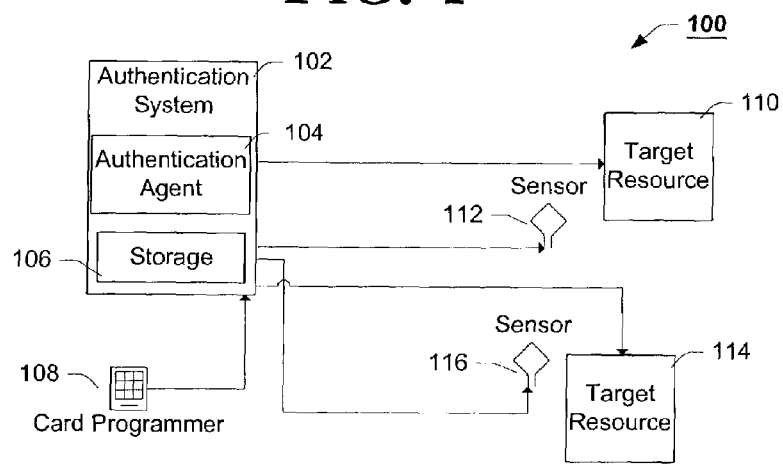
FIG. 1 is a block diagram of an example asset grouping suitable for implementing the authentication agent, in accordance with one example embodiment of the invention.

FIG. 1 is a block diagram of an example asset grouping suitable for implementing the authentication agent, in accordance with one example embodiment of the invention. An asset grouping is any grouping of one or more computing devices, electronic appliances, or other resources over which access is controlled. As depicted, asset grouping 100 includes authentication system 102, authentication agent 104, storage media 106, card programmer 108, target resources 110 and 114, and sensors 112 and 116 coupled as shown in FIG. 1.

Figure 5:
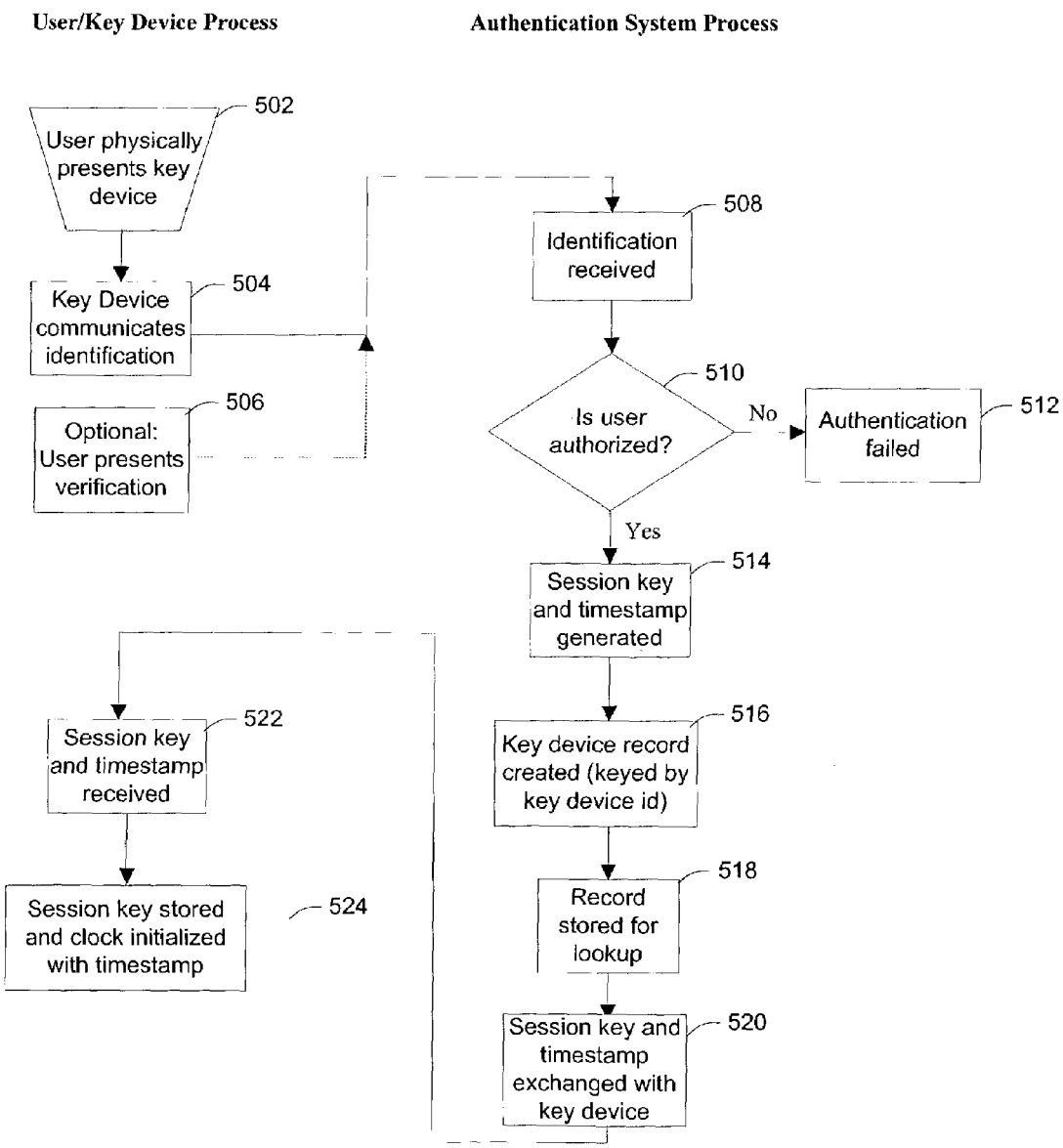
FIG. 5 is a flow chart of an example method for implementing strong user authentication, in accordance with one example embodiment of the invention.
Figure 6:
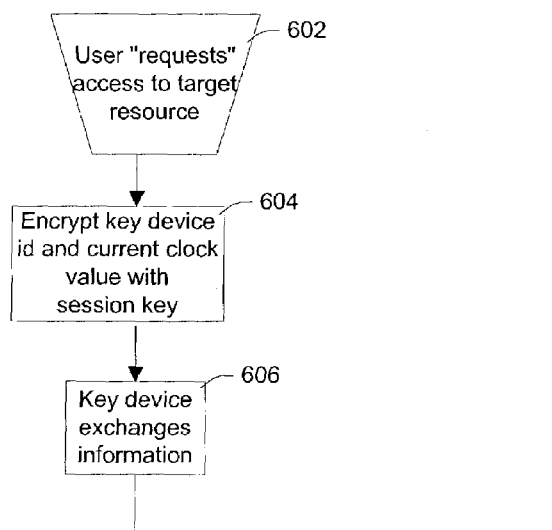
FIG. 6 is a flow chart of an example method for implementing proximity-based access control, in accordance with one example embodiment of the invention.
Figure 6:
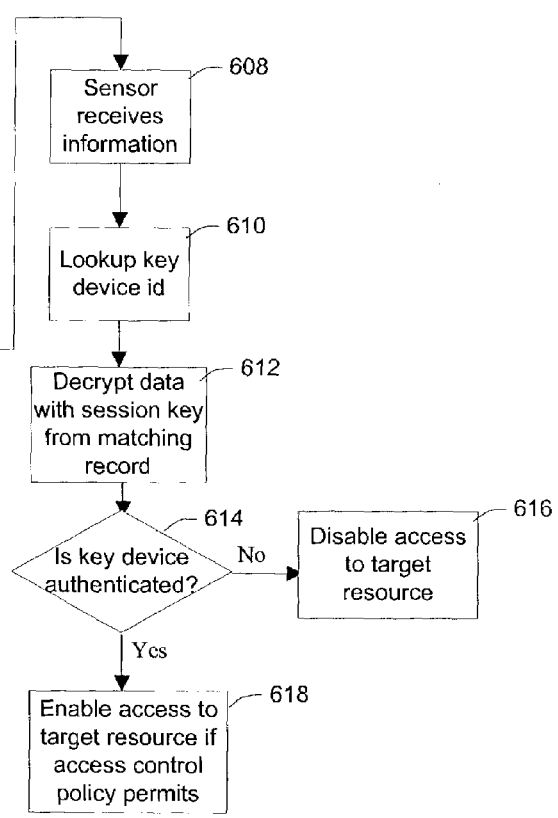

Asset grouping 100 includes authentication system 102 which secures access to the asset grouping by only allowing authorized users to access target resources 110 and 114, as described more fully with reference to FIG. 5 and FIG. 6. As shown, authentication system 102 is generally comprised of an authentication agent 104 and one or more storage media 106, according to one implementation. In alternate embodiments, the functionality of authentication system 102 may be performed by a system separate from asset grouping 100.

Figure 2:
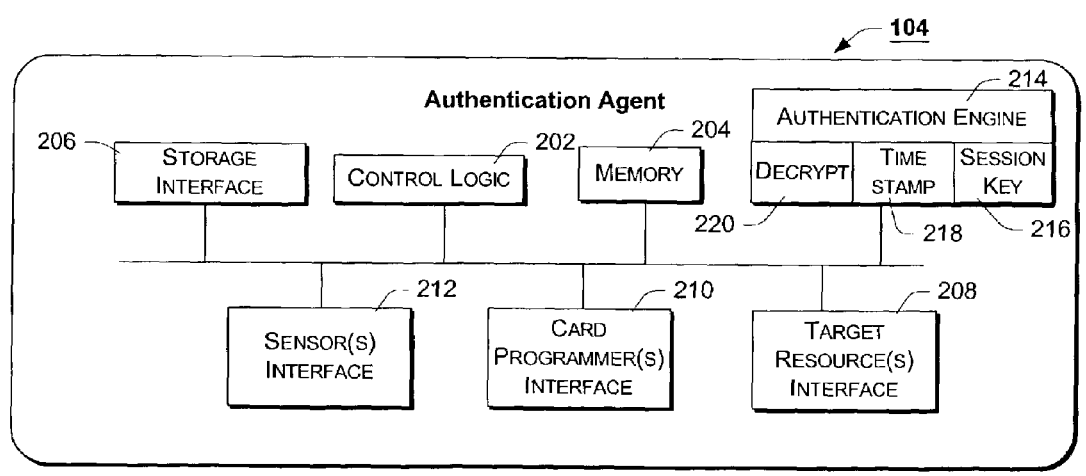
FIG. 2 is a block diagram of an example authentication agent, in accordance with one example embodiment of the invention.
Figure 4:
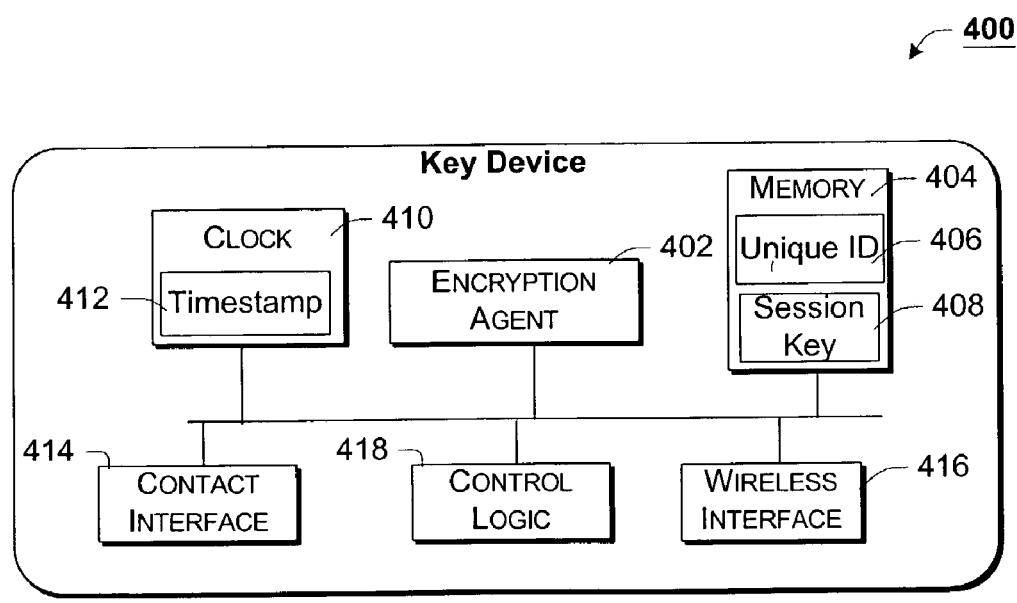
FIG. 4 is a block diagram of an example key device, in accordance with one example embodiment of the invention.

Authentication agent 104, which is explained in greater detail with respect to FIG. 2, communicates with key devices, which are explained in greater detail with respect to FIG. 4, through card programmer 108 and sensors 112 and 116. Through this communication, and through information stored in storage media 106, authentication agent 104 determines whether or not to enable access to target resources 110 and 114.

Storage media 106 contains the identities of at least a subset of all users (or the identities of key devices associated with the users) authorized to access target resources 110 and/or 114. In one embodiment, storage media 106 resides separately from authentication system 102 and is securely maintained by authorized operators.

Card programmer 108 communicates with a user's key device, which is described with reference to FIG. 4. In one embodiment card programmer 108 is located at an entrance to a building, and physically inserting a key device into card programmer 108 is required to gain entrance to the building. In another embodiment, users are required to provide further verification, such as a password, a thumb scan, a retinal scan, a voice print, or a facial comparison in order to gain entrance to a building. While only one card programmer 108 is shown in FIG. 1, any number of card programmers may be included in an asset grouping.

While two target resources (110, 114) are shown in FIG. 1, asset grouping 100 may contain any number of target resources. Target resources 110 and 114 may well include computing devices, electronic appliances, doors to access secure areas, or other resources to which there is a need to control access.

Sensors (e.g. 112, 116) are placed near target resources (110, 114) to wirelessly communicate with users' key devices that are near the resources. As shown in FIG. 1, sensor 112 is proximate to target resource 110, and sensor 116 is proximate to target resource 114. Other embodiments of an asset grouping may have multiple sensors proximate to a single target resource, or, alternatively, may have a single sensor proximate to multiple target resources. Also, sensors 112 and 116 may be of different types and/or configurations.

FIG. 2 is a block diagram of an example authentication agent, in accordance with one example embodiment of the invention. As shown, authentication agent 104 includes one or more of control logic 202, memory 204, storage interface 206, target resource(s) interface 208, card programmer(s) interface 210, sensor(s) interface 212, and authentication engine 214 coupled as shown in FIG. 2. In accordance with one aspect of the present invention, to be developed more fully below, authentication agent 104 includes an authentication engine 214 comprising one or more of session key services 216, timestamp services 218, and/or decryption services 220. It is to be appreciated that, although depicted as a number of disparate functional blocks, one or more of elements 202–220 may well be combined into one or more multi-functional blocks. Similarly, authentication engine 214 may well be practiced with fewer functional blocks without deviating from the spirit and scope of the present invention. For example, authentication engine 214 may be practiced without timestamp services 218, and instead a nonce (a number used once) generator may be used instead. In this regard, authentication agent 104 in general, and authentication engine 214 in particular, are merely illustrative of one example implementation of one aspect of the present invention. FIG. 2 is meant to facilitate ease of understanding, however one skilled in the art would appreciate that each of the components of authentication agent 104 need not be separate components as shown in the example embodiment.

As introduced above, authentication agent 104 communicates with key devices through card programmer 108 and sensors 112 and 116. Through this communication, and through information stored in storage media 106, authentication agent 104 determines whether to enable access to target resources 110 and 114.

As used herein control logic 202 provides the logical interface between authentication agent 104 and asset grouping 100. In this regard, control logic 202 manages one or more aspects of authentication agent 104 to provide a communication interface from a key device to computing elements resident on communicatively coupled network(s). According to one aspect of the present invention, control logic 202 receives initialization event indications such as, e.g., an interrupt, from a card programmer 108 or sensor (112, 116) indicating the presence of a key device. Upon receiving such an indication, control logic 202 selectively invokes the resource(s) of authentication engine 214. As part of an example authentication method, as explained in greater detail with reference to FIG. 5, control logic 202 selectively invokes session key services 216 and timestamp services 218 that generate a session key and a timestamp, respectively, when an authorized user presents a key device to a card programmer 108. Control logic 202 also selectively invokes timestamp services 218, which also functions as a clock and keeps timestamps updated. As part on an example access control method, as explained in greater detail with reference to FIG. 6, control logic 202 selectively invokes decryption services 220 that decrypts data received from a key device to determine whether or not to enable access to target resource(s). As used herein, control logic 202 is intended to represent any of a wide variety of control logic known in the art and, as such, may well be implemented as a microprocessor, a micro-controller, a field-programmable gate array (FPGA), application specific integrated circuit (ASIC), programmable logic device (PLD) and the like. In alternate implementations, control logic 202 is intended to represent content (e.g., software instructions, etc.), which when executed implements the features of control logic 202 described herein.

Memory 204 is intended to represent any of a wide variety of memory devices and/or systems known in the art. According to one example implementation, memory 204 may well include volatile and non-volatile memory elements. In accordance with one aspect of the present invention, memory 204 includes non-volatile memory element(s) used to maintain authentication information. According to one example implementation, the non-volatile memory elements are comprised of electronically erasable programmable read-only memory (EEPROM) element(s) (not specifically denoted). A graphical illustration of an example memory 204 is presented with reference to FIG. 3.

Storage interface 206 may allow control logic 202 to gain access to storage media 106, and thereby lookup a user's authority.

Target resource(s) interface 208 provides a path through which control logic 202 may selectively enable or disable access to target resources 110 and 114, as described in greater detail with reference to FIG. 6.

Control logic 202 receives information from and sends information to card programmer 108 through card programmer(s) interface 210.

Sensor(s) interface 212 provides a conduit for communications between sensors 112 and 116 and control logic 202.

As introduced above, authentication engine 214 is selectively invoked by control logic 202 to generate session key(s) and timestamp(s), updating timestamp(s), and decrypting data received from a key device. In accordance with the illustrated example implementation of FIG. 2, authentication engine 214 is depicted comprising one or more of session key services 216, timestamp services 218 and decryption services 220. Although depicted as a number of disparate elements, those skilled in the art will appreciate that one or more elements 216–220 of authentication engine 214 may well be combined without deviating from the scope and spirit of the present invention.

As introduced above, session key services 216 provide authentication agent 104 with the ability to generate a session key when an authorized user's key device is presented. In one example embodiment, session key(s) generated by session key services 216 are random numbers of a fixed number of digits.

As introduced above, timestamp services 218 provide authentication agent 104 with the ability to generate and maintain a timestamp. In one example embodiment, an initial timestamp for a particular user is the value of a clock or monotonic counter.

As introduced above, decryption services 220 provide authentication agent 104 with the ability to decrypt communications in accordance with any of a wide variety of known and proprietary cryptography functions. In this regard, decryption services 220 may well use Data Encryption Standard (DES) compliant cryptography functions such as, e.g., DES, 3-DES, and the like.

Figure 3:
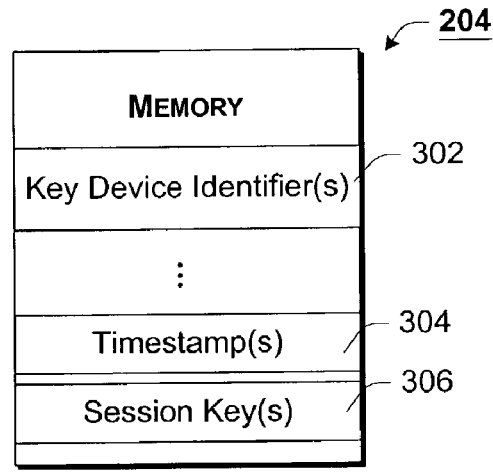
FIG. 3 is a graphical illustration of an example data structure used in accordance with the authentication agent, in accordance with one example embodiment of the invention.

FIG. 3 is a graphical illustration of an example data structure used in accordance with the authentication agent, in accordance with one example embodiment of the invention. Memory 204 stores key device identifier(s) 302, timestamp(s) 304, and session key(s) 306.

Key device identifier(s) 302 may include the identities of key devices that are currently authenticated to access target resources.

A timestamp 304 and session key 306 are maintained for each authorized user who has an active session. A session begins when an authorized key device is presented to card programmer 108 and ends when a certain amount of time has elapsed, the key device has left a certain area, etc. Timestamp 304 is the time, as reported by the timestamp services 218, at which the session was begun. In an alternate embodiment, timestamp 304 is a time at which the session expires. In yet another embodiment, timestamp 304 is a nonce generated by the key device.

Session key 306 is a value, appropriate for the encryption algorithm being used, that is generated by control logic 202 for each authorized key device at the beginning of a session. In addition to being stored in memory 204, session key 306 is also stored in the associated key device. Session key 306 is used for encryption by the key device and decryption by decryption services 220.

FIG. 4 is a block diagram of an example key device, in accordance with one example embodiment of the invention. As shown, key device 400 includes encryption agent 402, memory 404, unique identification (ID) 406, session key 408, clock 410, timestamp 412, contact interface 414, wireless interface 416, and control logic 418 coupled as shown in FIG. 4. FIG. 4 is meant to facilitate ease of understanding, however one skilled in the art would appreciate that each of the components of key device 400 need not be separate components as shown in the example embodiment.

Key device 400 includes encryption agent 402 to encrypt information, as described in greater detail with reference to FIG. 6.

Memory 404 stores unique ID 406 and session key 408. In one embodiment, memory 404 is a low power flash memory.

Unique ID 406 is, in most cases, used to identify the user associated with the key device. It is read by card programmer 108 and sensor(s) 112/116, and used by control logic 202 to determine whether or not the associated user is authorized.

Encryption agent 402, to encrypt unique ID 406 and timestamp 412, uses session key 408, which was generated by control logic 202. Session key 408 may be of any length deemed adequate to ensure secure communication and appropriate for the encryption/decryption algorithm being used.

Clock 410 stores timestamp 412 and updates timestamp 412 as time passes. In one embodiment, clock 410 is a monotonic counter and timestamp 412 is a counter value incremented by clock 410. In an alternate embodiment, a nonce generator and a nonce replace clock 410 and timestamp 412, respectively.

Contact interface 414 allows key device 400 to communicate with card programmer 108. In one embodiment, contact interface 414 includes metal fingers (or pads) that are designed to make contact with corresponding metal connections in card programmer 108.

Wireless interface 416 allows key device 400 to communicate with sensors 112 and 116. In one embodiment wireless interface 416 is a transceiver based on a conventional wireless standard.

As used herein control logic 418 provides the logical interface between key device 400 and asset grouping 100. In this regard, control logic 418 manages one or more aspects of key device 400 to provide a communication interface from the key device to asset grouping 100.

FIG. 5 is a flow chart of an example method for implementing strong user authentication, in accordance with one example embodiment of the invention. The method begins with step 502 wherein a user physically presents a key device. One such example would be for a user to insert key device 400 into card programmer 108. The key device then communicates identification, such as unique ID 406, with the authentication system (step 504). Optionally, there can be an additional step 506, wherein the user presents verification, such as typing a password or submitting to a retinal, fingerprint, voice, or facial scan.

The identification (and optional verification) is then received by the authentication system (step 508). In the case of authentication system 102, card programmer(s) interface 210 makes this identification available to authentication agent 104. Authentication agent 104 looks for a record of unique ID 406 in storage media 106 through storage interface 206 to determine whether the user is authorized (step 510).

If there is no record of unique ID 406 in storage media 106 (step 512), then the user fails authentication. Also, if the optional verification data does not match that associated with unique ID 406, then the user fails authentication. To provide some examples, although, of course, the claimed subject matter is not limited in scope in this respect, a user who fails authentication may then be locked out of a building or a security guard may be alerted of the unauthorized user.

If, however, there is a record of unique ID 406 in storage media 106 (and, optionally, verification information that matches the stored information) that authentication agent 104 interprets as giving the user authorization (an implicit authorization to receive the programmed data), then control logic 202 selectively invokes session key services 216 and timestamp services 218 to generate a session key 306 and a timestamp 304, respectively, for the user's session (step 514). In one embodiment, the timestamp value is determined in part on the user's level of security, which is part of the user's record in storage media 106. In another embodiment different timestamps are generated for different target resources to which the user has authority to access, also based on the user's level of security.

Timestamp 304 and session key 306 together make up a key device record, which is created (step 516) with reference to the key device's unique ID and saved to memory 204 (step 518). Additional information may be stored in this record. The record may also be persisted to storage 106.

Authentication agent 104 then sends the timestamp and session key through card programmer(s) interface 210 to the key device in card programmer 108 (step 520). Key device 400 receives the timestamp and session key (step 522), which are stored in clock 410 and memory 404, respectively, through contact interface 414. Finally, clock 410 is initialized and begins updating timestamp 412 (step 524). One skilled in the art would appreciate that the session key and generated by authentication agent 104 and communicated to key device 400 is a secret. In other words, the session key must be communicated to the key device in a manner that does not permit it to be known by another device, such as by using a physical connection.

FIG. 6 is a flow chart of an example method for implementing proximity-based access control, in accordance with one example embodiment of the invention. The method begins with step 602 wherein a user (with his key device) "requests" access to a target resource. The "request" can be an explicit action on the user's part, such as logging into a computer, or can be implicit, such as the user being near to a door. When key device 400 is close enough to sensor 112 or 116 for wireless communication to occur, at periodic intervals either determined by the key device 400 or by the authentication agent 104 or by the user "requesting" access to resource 110 or 114, the key device 400 communicates with the sensor 112 or 116. Encryption agent 402 then encrypts unique ID 406 and timestamp 412 with session key 408 (step 604). In one embodiment, sensor 112 or 116 sends a signal to key device 400 to initiate the encryption process. In an alternate embodiment, key device 400 initiates the encryption process on its own.

Key device 400 then transmits unique ID 406, as well as the encrypted unique ID and the encrypted timestamp, through wireless interface 416 to the proximate sensor (step 606). The proximate sensor receives the information (step 608) and forwards it to authentication agent 104 through sensor(s) interface 212.

Control logic 202 first takes the unique ID received and looks (step 610) in memory 204 for any active session associated with key device 400. If key device 400 were still considered to be authenticated by authentication system 102, as established through the method described with reference to FIG. 5, then there would be an active session for key device 400 and an associated session key 306 and current timestamp 304 would be present in memory 204.

Control logic 202 then takes session key 306, which was associated with key device 400 and stored in memory 204, and selectively invokes decryption services 220 to decrypt (step 612) the encrypted unique ID and the encrypted timestamp. Control logic 202 then determines whether or not the key device is authenticated (step 614) based on whether the decrypted data matches the expected results.

If the unique ID which encryption agent 402 encrypted and decryption services 220 decrypted does not exactly match the unique ID sent unencrypted, or if the timestamp (or nonce) which encryption agent 402 encrypted and decryption services 220 decrypted is not unique (has not been used previously with this session key), then access to the target resource is disabled (step 616). Access is disabled by control logic 202 through target resource(s) interface 208. One example of disabling access, although, of course, the claimed subject matter is not limited in scope in this respect, is the locking of a keyboard in the case of a computing target resource.

On the other hand, if the unique ID that was encrypted by encryption agent 402 and decrypted by decryption services 220 exactly matches the unique ID sent unencrypted, and the timestamp that was encrypted by encryption agent 402 and decrypted by decryption services 220 is unique, then the user is considered to be authenticated. Access to the target resource is enabled (step 618) if the access control policy permits it (e.g. the user has permissions to access the associated target resource, the time since last strong authentication is acceptable, etc.). One skilled in the art would appreciate that a replay attack, based on the broadcast of key device 400, would fail because the timestamp and session key could not be determined from the encrypted message. A retransmission of the same encrypted timestamp (or nonce) at a later time would result in the authentication agent 104 detecting that the same timestamp (or nonce) was used more than once with a given session key and failing the authentication.

Access to the target resource can be enabled, by control logic 202 through target resource(s) interface 208, for a definable period of time, at which point access to the target resource may then be disabled. One example of enabling access to a target resource, although, of course, the claimed subject matter is not limited in scope in this respect, is the unlocking of a door for ten seconds. Different target resources and users may have different periods for which access is enabled. Access to a target resource may also revert from enabled to disabled when communication between the sensor and key device has been lost. Also, the method as described in reference to FIG. 6 may be continuously repeated in order to detect a user's departure or to disable access at the expiration of a user's session key. At the expiration of a user's session key, the user may have to re-authenticate, for example by presenting key device 400 to card programmer 108 as in step 502. In another embodiment, the user may be able to obtain a new session key through a different method.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A method of authenticating a user of target resource(s), the method comprising:
   securely communicating with a key device associated with the user to identify the user;
   retrieving credentials for the user;
   securely communicating a session key to the key device; and
   identifying the user who is requesting access to the target resource(s) based on the user's credentials while the user's key device is proximate to the target resource(s).

2. The method of claim 1, further comprising:
   requiring the user to re-authenticate at an expiration of a definable timeframe.

3. The method of claim 2, further comprising:
   re-authenticating the user through a different method than was employed for the initial authentication.

4. The method of claim 1, wherein securely communicating with the key device comprises communicating through a physical connection.

5. The method of claim 1, further comprising:
receiving a user-specific verification including one or more of a password, a fingerprint scan, a retinal scan, a voice print, and a facial comparison.

6. The method of claim 1, wherein identifying the user who is requesting access to the target resource(s) based on the user's credentials while the user's key device is proximate to the target resource(s) comprises:
communicating with the key device to receive a unique identification (ID), the unique ID encrypted with the session key, and a nonce encrypted with the session key;
retrieving the session key based on the unique ID received;
decrypting the unique ID and nonce with the session key retrieved;
verifying that the decrypted unique ID received matches the unique ID received;
verifying that the nonce is valid; and
identifying the user for the purpose of determining access to the target resource(s) if the verifications are successful.

7. The method of claim 6, wherein communicating with the key device comprises communicating through wireless communication.

8. A machine-readable medium having stored thereon sequences of instructions that when executed by one or more processors cause the one or more processors to:
securely communicate with a key device associated with the user to identify the user;
retrieve credentials for the user;
securely communicate a session key to the key device; and
allow the user who is requesting access to the target resource(s) to be identified based on the user's credentials while the user's key device is proximate to the target resource(s).

9. The machine-readable medium of claim 8 further comprising sequences of instructions that when executed cause the one or more processors to require the user to re-authenticate at an expiration of a definable timeframe.

10. The machine-readable medium of claim 9 further comprising sequences of instructions that when executed cause the one or more processors to re-authenticate the user in a method different than was used for the initial authentication.

11. The machine-readable medium of claim 8 wherein the sequences of instructions that when executed cause the one or more processors to securely communicate with the key device comprises sequences of instructions that when executed cause the one or more processors to communicate through a physical connection.

12. The machine-readable medium of claim 8 further comprising sequences of instructions that when executed cause the one or more processors to receive a user-specific verification including one or more of a password, a fingerprint scan, a retinal scan, a voice print, and a facial comparison.

13. The machine-readable medium of claim 8 wherein the sequences of instructions that when executed cause the one or more processors to allow the user who is requesting access to the target resource(s) to be identified based on the user's credentials while the user's key device is proximate to the target resource(s) comprises sequences of instructions that when executed cause the one or more processors to:
communicate with the key device to receive a unique identification (ID), the unique ID encrypted with the session key, and a nonce encrypted with the session key;
retrieve the session key based on the unique ID received;
decrypt the unique ID and nonce with the session key retrieved;
verify that the decrypted encrypted unique ID received matches the unique ID received;
verify that the nonce is valid; and
identify the user for the purpose of determining access to the target resource(s) if the verifications are successful.

14. The machine-readable medium of claim 13 wherein the sequences of instructions that when executed cause the one or more processors to communicate with the key device comprises sequences of instructions that when executed cause the one or more processors to communicate through wireless communication.

15. A secure asset grouping comprising:
means for communicating with a key device associated with a user;
means for retrieving credentials for the user;
means for securely communicating a session key and to the key device; and
means for identifying the user based on the user's credentials while the user's key device is proximate to the target resource(s).

16. The secure asset grouping of claim 15 further comprising means for requiring the user to re-authenticate at an expiration of a definable timeframe.

17. The secure asset grouping of claim 16 further comprising means for re-authenticating the user through a different method than was employed for the initial authentication.

18. The secure asset grouping of claim 15, wherein the means for securely communicating with the key device comprises means for communicating through a physical connection.

19. The secure asset grouping of claim 15 further comprising:
means for receiving a user-specific verification including one or more of a password, a fingerprint scan, a retinal scan, a voice print, and a facial comparison.

20. The secure asset grouping of claim 18 wherein the means for identifying the user based on the user's credentials while the user's key device is proximate to the target resource(s) comprises:
means for communicating with the key device to receive a unique identification (ID), the unique ID encrypted with the session key, and a nonce encrypted with the session key;
means for retrieving the session key based on the unique ID received;
means for decrypting the unique ID and nonce with the session key retrieved;
means for verifying that the decrypted encrypted unique ID received matches the unique ID received;
means for verifying that the nonce is valid; and
means for identifying the user for the purpose of determining access to the target resource(s) if the verifications are successful.

21. The secure asset grouping of claim 20 wherein the means for communicating with the key device comprises means for communicating through wireless communication.

22. A secure asset grouping comprising:
storage device(s) to store and retrieve data;
card programmer(s) to securely communicate with key device(s);
proximity sensor(s) to communicate through wireless communication with key device(s); and
an authentication agent coupled with the storage device(s), the card programmer(s), and the proximity sensor(s) to identify users who request access to target resource(s).

23. The secure asset grouping of claim 22 wherein the authentication agent comprises a computing device.

24. The secure asset grouping of claim 23 wherein the authentication agent comprises a software program.

25. A key device comprising:
means for storing a unique ID;
means for receiving and storing a session key from a secure asset grouping;
means for generating nonces;
means for encrypting the unique ID and a nonce with the session key; and
means for communicating with the secure asset grouping.

26. The key device of claim 25 wherein the means for communicating with the trusted asset grouping comprises means for communicating wirelessly.

27. The key device of claim 25 wherein the means for receiving a session key from a secure asset grouping comprises means for interfacing with a card programmer.

28. A key device capable of being carried in a pocket of a user comprising:
a storage to store data;
a nonce generator to generate nonces;
a communication path to communicate with a secure asset grouping; and
an encryption agent coupled with the storage, the nonce generator, and the communication path to encrypt data retrieved from the storage and nonce generator and to transfer data along the communication path.

29. The key device of claim 28 wherein the communication path comprises a wireless communication transmitter.

30. The key device of claim 28 wherein the communication path comprises a physical interface to couple with a card programmer.

* * * * *